3,003,956
METHOD OF CONVERTING AN AQUEOUS DRILLING FLUID TO A PACKER FLUID

Clarence O. Walker, Houston, and Walter J. Weiss, Sugar Land, Tex., assignors to Texaco Inc., a corporation of Delaware
No Drawing. Filed Dec. 6, 1957, Ser. No. 700,970
2 Claims. (Cl. 252—8.55)

This invention relates to drilling fluids and to the drilling of wells through subsurface formations by means of well drilling tools. This invention particularly relates to a drilling operation, such as a rotary drilling operation, which involves the circulation of a drilling fluid down the well bore, about the drilling bit and back to the surface. In a rotary drilling operation a drilling fluid is pumped down the drill stem to the drilling bit at the bottom of the bore hole. The stream of drilling fluid then passes through the drilling bit and moves upwardly within the annular space between the drill stem and the well bore wall carrying with it the drilling cuttings.

After the drilling operation has been concluded, or during a halt in the drilling operation, sometimes a portion of the drilling fluid is left behind in the bore hole to serve as a packer fluid during subsequent testing of the petroleum producing formation and/or production of petroleum therefrom and/or the well completion operations.

Packer fluids are sometimes subjected to fairly high temperatures, e.g., above about 250° F., for a substantial length of time, days and even months. It is desirable, therefore, that a well packer fluid be thermally stable and remain fluid or readily pumpable even after exposure to high temperatures for prolonged periods of time. Sometimes, however, due to prolonged exposure at a relatively high temperature within the well bore the packer fluids tend to become unpumpable and form plastic, or rock-like materials. When this occurs casing and tubing and other equipment in contact with the packer fluid become, in effect, cemented therein. Moreover, when this occurs the packer fluid cannot readily be removed from the well bore. In this event it is necessary to remove mechanically or to drill out the solidified packer fluid, perhaps at the same time losing valuable equipment and increasing the cost of the well.

Drilling fluids which contain calcium hydroxide generally cannot satisfactorily be employed as packer fluids. Drilling muds having a relatively high proportion of calcium hydroxide therein, such as an aqueous phase which is saturated with calcium hydroxide, together with excess undissolved calcium hydroxide, when subjected to a relatively high temperature for prolonged periods of time under relatively static conditions, tend to harden and form a cement-like material. Because of the difficulties which have arisen when such fluids have been exposed to relatively high temperatures for substantial lengths of time, present practices are tending to replace these types of muds with freshly prepared packer fluids.

Accordingly, it is an object of this invention to provide a method whereby a lime drilling fluid or a drilling fluid characterized by the presence of a substantial amount of calcium hydroxide therein, such as an aqueous phase thereof saturated with calcium hydroxide and containing excess undissolved lime, might be satisfactorily treated so that it can be suitably employed as a packer fluid.

Another object of this invention is to provide a method for converting a calcium hydroxide-containing drilling fluid into a relatively temperature stable fluid which can be suitably employed as a packer fluid during well completion.

Still another object of this invention is to provide an improved well completion operation.

Yet another object of this invention is to provide in a well drilling operation an improved method for converting a lime-containing or lime-base drilling mud into a temperature stable packer fluid.

How these and other objects of this invention are accomplished will become apparent in the light of the accompanying disclosure.

In accordance with this invention it has now been discovered that an aqueous calcium hydroxide-containing drilling fluid or a lime drilling mud is convertible into a relatively temperature stable packer fluid by treating the calcium hydroxide-containing drilling fluid with an acid in an amount at least sufficient to neutralize substantially all of the calcium hydroxide in the drilling fluid. Preferably the acid is an acid the calcium salt of which is substantially water insoluble or relatively slightly ionizable.

Various types of calcium hydroxide-containing fluids are suitably converted in accordance with the practice of this invention into a relatively temperature stable packer fluid. For example, a so-called low lime drilling fluid which is usually characterized as an aqueous drilling fluid containing an alkaline (pH of about 12.5) aqueous phase which is saturated with calcium hydroxide and which contains a small amount, in the range about 0.125–1.0 lb., of sodium hydroxide therein thereby yielding a drilling fluid having a relatively low calcium ion concentration, below about 200–250 parts per million by weight (p.p.m.), is readily converted in accordance with the practice of this invention into a temperature stable packer fluid. Further, a so-called high pH lime mud such as an aqueous drilling mud having an aqueous phase which is saturated with calcium hydroxide and which contains dissolved therein a relatively large amount of sodium hydroxide, such as an amount of sodium hydroxide in the range 1–6 lbs. per barrel of drilling fluid, is suitably converted in accordance with the practice of this invention into a temperature stable packer fluid. A high pH lime mud generally has a pH substantially above 12.5, such as a pH in the range 12.6–13.5, depending upon the amount of sodium hydroxide added thereto. A high pH lime mud is further characterized by having an alkaline aqueous phase which contains a relatively low dissolved calcium or calcium ion concentration, e.g., a calcium ion concentration below about 200 p.p.m., usually below about 100 p.p.m.

The practice of this invention is particularly applicable to the conversion of a high calcium, relatively low pH lime drilling fluid which contains undissolved lime (calcium hydroxide) and which has an aqueous phase characterized by a relatively high dissolved calcium or calcium ion concentration, above about 200 p.p.m., preferably in the range 300–1500 p.p.m., into a temperature stable packer fluid. The aqueous phase of this type of calcium hydroxide-containing drilling fluid is characterized by a relatively low pH, not in excess of 12.6, the pH corresponding to a saturated aqueous solution of calcium hydroxide. A mud of this type might be designated as a low pH, high calcium lime mud and has been found to be very useful for drilling through heaving shale formations. This type of mud is more thoroughly described in U.S. 2,802,783, issued August 13, 1957, the disclosures of which patent are herein incorporated and made a part of this disclosure.

As indicated hereinabove, in accordance with the practice of this invention a calcium hydroxide-containing aqueous drilling fluid is convertible into a temperature stable packer fluid by treating said drilling fluid with an acid in an amount at least sufficient to neutralize substantially all of the calcium hydroxide in the drilling fluid. Preferably the acid is an acid the calcium salt of which is substantially water insoluble or is slightly ionizable so that any calcium present dissolved in the drilling fluid undergoing treatment, the calcium being either derivable from the calcium hydroxide or from an extraneous source, e.g., an added water soluble calcium salt such as calcium chloride or calcium sulfate, is precipitated or sequestered.

Acids which are suitably employed in the practice of this invention include the various mineral acids and the various organic acids. Suitable mineral acids are hydrochloric acid, sulphuric acid and the like. Phosphoric acid and hydrofluoric acid are particularly useful since the calcium salts of these acids are substantially water insoluble.

Water soluble organic acids are also employed, and are preferred, in the practice of this invention. Suitable organic acids are acetic acid, formic acid, maleic acid, gluconic acid and the like. Particularly suitable organic acids are oxalic acid and citric acid. The calcium salt of oxalic acid, calcium oxalate, is substantially water insoluble. The calcium salt of citric acid, calcium citrate, although evidencing some solubility, is but slightly ionizable, the citrate anion serving to sequester or chelate the calcium ion. Other suitable organic acids are known. Also the organic acid may be generated in situ by incorporating in the mud a salt of an organic acid such as sodium citrate and an inorganic acid such as hydrochloric acid.

Mixtures of mineral (inorganic) and organic acids may be employed in the practice of this invention, it being necessary to employ an amount of acid sufficient to neutralize substantially all of the calcium hydroxide in the drilling fluid undergoing treatment. Desirably substantially all of the dissolved calcium or calcium ion in the aqueous phase of the drilling fluid should be precipitated therefrom or sequestered therein. Accordingly, in accordance with one embodiment of the practice of this invention the lime content (hydroxide portion thereof) of the drilling fluid undergoing treatment can be effectively neutralized by an acid and the dissolved calcium portion thereof in the aqueous phase can be removed therefrom or sequestered therein by contact with a suitable chelating or sequestering agent or anion, such as by the addition thereto of sodium carbonate, sodium citrate, sodium oxalate, sodium gluconate and the like.

In some instances in the practice of this invention it is desirable to incorporate in the drilling fluid undergoing treatment a buffering agent, such as a water soluble carbonate or a water soluble citrate and the like in an amount sufficient to avoid any undesirable side reactions in the drilling fluid undergoing treatment. Suitable buffering agents include sodium carbonate and sodium citrate.

In an actual field trial of the practice of this invention 304 barrels of a low lime drilling mud containing about 0.25 lb. NaOH, 2 lbs. lime, per barrel of drilling mud together with 2–3 lbs. of Q-Broxin, a ferro-chrome lignosulfonate, per barrel of drilling fluid as a clay dispersing agent therein, were treated over a period of 12 hours with 4.3 lbs. citric acid per barrel of drilling fluid. Thickening of the mud in the pits occurred, thereupon approximately 1 lb. per barrel of citric acid and ½ lb. per barrel of caustic (NaOH) equivalent to 1.1 lbs. per barrel sodium citrate and enough water to solvate the mixture were added to the neutralized mud via a chemical barrel placed over the mud tanks. Approximately 4 hours were taken to circulate and to mix the resulting mud system in order to assure uniformity of the packer fluid. The resulting neutralized mud system was displaced into the tubing and spotted behind the packer. Various mud samples were taken during the aforesaid operations and the properties thereof tested. The properties of these mud samples obtained just before, during and after conversion to a packer fluid with citric acid in accordance with this invention are set forth in accompanying Table I.

*Table I*

| Mud sample | Properties before bombing | | | | Shear #/100 sq. ft. after bombing | | | |
|---|---|---|---|---|---|---|---|---|
| | pH | $P_m$ | $P_f$ | $M_f$ | 72 hours at— | | 8 days at 350° F. | 30 days at 350° F. |
| | | | | | 275° F. | 350° F. | | |
| Just before conversion | 11.90 | 5.7 | 0.6 | 2.6 | 510 | 725 | | |
| During conversion | 9.87 | 1.2 | 0.2 | 3.1 | | | | |
| Just after conversion | 9.18 | 0.5 | 0.05 | 3.6 | 375 | 700 | 665 | 700 |
| Just before conversion and after standing for three weeks | 11.5 | 5.0 | 0.45 | 2.6 | | 3,010 | | |

$P_m$ is defined as number of cc. of N/50 $H_2SO_4$ required to titrate 1 cc. of the whole mud.
$P_f$ is defined as number of cc. of N/50 $H_2SO_4$ required to titrate 1 cc. of aqueous phase (filtrate) of drilling fluid to a phenolphthalein end point and is a measure of the soluble hydroxyl ion content.
$M_f$ is defined as number of cc. of N/50 $H_2SO_4$ required to titrate 1 cc. of aqueous phase (filtrate) of drilling fluid to methyl orange end point and is a measure of the soluble hydroxyl and carbonate ion content.

It was observed from the data obtained in connection with the test set forth in connection with Table I that the mud left behind the packer did not show as much reduction of high temperature solidification as was expected. Since large lumps of native clay were observed during the conversion operation while mixing the tanks it was believed that the tank bottoms were loaded with native clay. Indications of this condition were obtained when it was found very difficult to thin back the citric acid treated mud during the actual conversion operation. This situation would explain the inability to thin satisfactorily the converted mud since the fresh clay solids would consume the added chemicals and would increase gel strength of the mud. Treatment of a "before conversion" mud sample in the laboratory gave very substantial and the expected reduction in shear. Contamination of the "before conversion" sample with high yield clay and then conversion to a packer fluid with citric acid and sodium citrate gave results comparable to those observed during the actual conversion. These results are set forth in accompanying Table II.

*Table II*

| Laboratory conversion | Properties before bombing | | | | Shear #/100 sq. ft. after bombing at 350° F. |
|---|---|---|---|---|---|
| | pH | $P_m$ | $P_f$ | $M_f$ | |
| Just before conversion sample+4#/bbl. citric acid +1½#/bbl. sodium citrate. | 10.2 | 0.9 | 0.15 | 2.9 | 255 (24 hrs.). |
| Just before conversion sample+3#/bbl. high yield clay+4.3#/bbl. citric acid +1#/bbl. sodium citrate. | 9.42 | 0.7 | 0.15 | 2.0 | 716 (72 hrs.). |

From the foregoing data set forth in Table II upon comparison with the data set forth in Table I it appears that the added clay solids in the mud tank affected the actual mud conversion. To remove this difficulty it is desirable that conversions be made in clean tanks free of contaminating materials such as native clay solids.

As will be apparent to those skilled in the art in the light of the foregoing disclosure many modifications, sub-

We claim:

1. A method of converting an aqueous drilling fluid which contains an alkaline aqueous phase having a pH not greater than 12.6, said aqueous phase containing hydratable clayey material dispersed therein by a clay dispersing agent and having a calcium ion concentration in excess of 200 parts per million by weight based on said aqueous phase, said aqueous phase being saturated with calcium hydroxide, into a temperature stable packer fluid which comprises adding to said drilling fluid an amount of citric acid sufficient to neutralize substantially all of said calcium hydroxide in said drilling fluid and to sequester substantially all of the calcium dissolved in the aqueous phase of said drilling fluid.

2. A method in accordance with claim 1 wherein there is also added to said drilling fluid a minor amount of a buffering agent selected from the group consisting of a water soluble carbonate and a water soluble citrate.

References Cited in the file of this patent

UNITED STATES PATENTS

| | | |
|---|---|---|
| 2,343,113 | Jones | Feb. 29, 1944 |
| 2,391,622 | Dunn | Dec. 25, 1945 |
| 2,491,437 | Perkins | Dec. 13, 1949 |
| 2,571,093 | Temple | Oct. 16, 1951 |
| 2,793,996 | Lummus | May 28, 1957 |
| 2,802,783 | Weiss et al. | Aug. 13, 1957 |
| 2,836,556 | Thompson et al. | May 27, 1958 |

OTHER REFERENCES

Jones: Chemical Treatment of Cement Contaminated Drilling Muds, article in World Oil, May 1949, pp. 106 to 112.

Rogers: Composition and Properties of Oil Well Drilling Fluids, revised ed., pub. 1953 by Gulf Pub. Co. of Houston, Texas, pp. 457, 458 and 459.

McLaurin et al.: New High Weight Mud Saves Rig Time, article in The Petroleum Engineer, December 1955, pp. B83, B84 and B85.